United States Patent Office

3,180,837
Patented Apr. 27, 1965

3,180,837
POLYMERIZATION CATALYST CONTAINING POLYMERIC DIENE-ALUMINUM COMPOUNDS
John MacMillan Bruce, Jr., and Ivan Maxwell Robinson, Wilmington, Del., assignors to E. I. du Pont de Nemours and Company, Wilmington, Del., a corporation of Delaware
No Drawing. Original application Mar. 30, 1960, Ser. No. 18,520. Divided and this application Nov. 21, 1962, Ser. No. 239,377
6 Claims. (Cl. 252—429)

The present invention relates to novel organometallic compounds, and, more particularly, to novel aluminum hydrocarbon compounds having greater improved hydrolytic stability. This application is a division of Serial No. 18,520, filed March 30, 1960, which in turn is a continuation-in-part of Serial No. 635,105, filed January 22, 1957, now abandoned.

Organometallic aluminum compounds in which the valences of the metal are satisfied by alkyl or aromatic radicals are well known in the art. Aluminum alkyls and aryls are valuable intermediates in the preparation of other organic compounds and, furthermore, have been found to catalyze the polymerization of ethylenically unsaturated monomers to low molecular weight polymers. Aluminum alkyls and aryls when reacted with transition metal halides form reaction products which are extremely active polymerization catalysts and will cause the formation of high molecular weight, solid polymers from a great variety of hydrocarbon monomers.

The aluminum trialkyls and triaryls known heretofore, however, have one disadvantage in that they are extremely unstable and even inflammable when brought in contact with air or water. The hydrolytic instability of aluminum trialkyls and aryls makes the preparation of aluminum alkyls, their storage and their use, hazardous and unpredictable. It would, therefore, be highly desirable to prepare organometallic aluminum compounds which have substantially the same catalytic activity as the known aluminum trialkyls, but which are stable towards exposure to moisture and air.

It is, therefore, one of the objects of the present invention to prepare organometallic aluminum compounds which have improved hydrolytic and thermal stability but also form highly active polymerization catalysts when combined with transition metal halides. It is another object to provide novel polymerization catalysts. Other objects will become apparent hereinafter.

The objects of the present invention are accomplished by novel organometallic aluminum compounds having the following structure

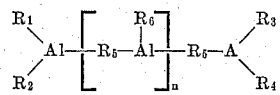

where $R_1$, $R_2$, $R_3$ and $R_4$ are selected from the class consisting of alkyl or alkenyl radicals, $R_5$ is an alkylene radical, $R_6$ is selected from the group consisting of alkyl, alkenyl and alkylene radicals, and $n$ is an average number of greater than 1, and preferably from 1 to 20 inclusive. In accordance with the present invention, it was discovered that aluminum when reacted with dienes forms organoaluminum polymers which have outstanding hydrolytic stability as compared to aluminum trihydrocarbons, and which, nevertheless, on reaction with transition metal halides, form olefin polymerization catalysts having catalytic activty equivalent to catalysts formed with aluminum trihydrocarbons.

The formation of the organometallic aluminum polymers of the present invention can be understood by the following reaction scheme employing as example, the formation of the aluminum polymer by exchange reaction of a diene, isoprene, with an aluminum trialkyl, aluminum triisobutyl.

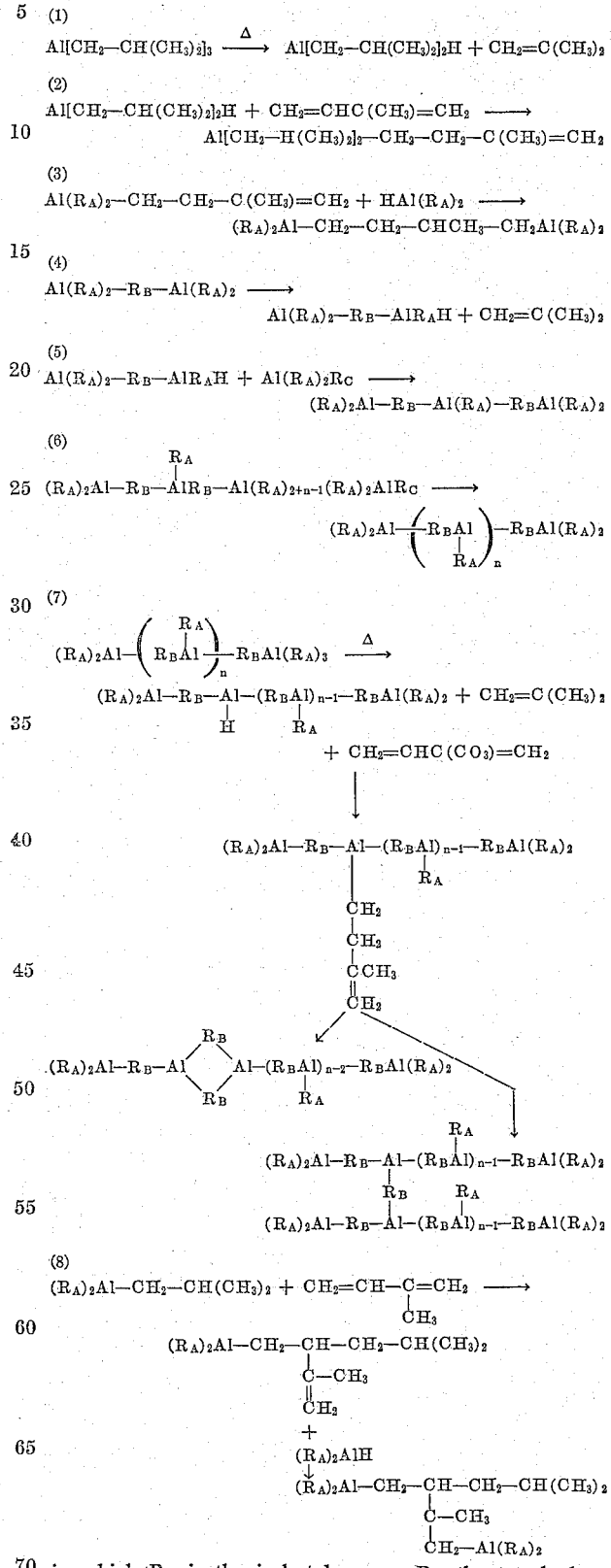

in which $R_A$ is the isobutyl group, $R_B$ the tetrahydroisoprenylene, and $R_C$ the dihydroisoprenyl group. As will be apparent to one skilled in the art, further substitution of the isobutyl groups by dihydroisoprenyl groups in the chain as well as at the terminal groups of the chain can occur. Furthermore, the reaction of the dihydroisoprenyl group to form a tetrahydroisoprenylene group does not necessarily have to follow and, thus, the organometallic aluminum polymers of the present invention can contain a substantial number of dihydroisoprenyl groups. A further reaction, the addition reaction, whereby a dihydroisoprenyl unit can slip in between an aluminum atom and an isobutyl group or an aluminum atom and a dihydroisoprenyl group has been found to occur. These unsaturated $C_9$ and $C_{10}$ groups can also react in the bridging and the cross-linking reaction, increasing the molecular weight of the polymer. The foregoing reactions are illustrated in (8) above. The aluminum diene polymers obtained can thus differ in their alkyl, alkenyl and alkylene groups, even though only a single diene is employed. It will be apparent that once the product of reaction (2) has been formed with all of the aluminum triisobutyl present, the molecular weight of the polymer can be increased without addition of isoprene until all of the aluminum trihydrocarbon has been polymerized. Additional isoprene will then substitute isobutyl groups in the chain and result in formation of double linkages and cross-links between aluminum.

The dienes that are useful in the formation of organometallic aluminum polymers are aliphatic and cycloaliphatic dienes which contain at least two ethylenically unsaturated double bonds and are selected from the class consisting of dienes containing at least two terminal double bonds separated by no more than four unsubstituted carbon atoms and dienes having one terminal double bond, at least one internal double bond and a methyl group separated from said terminal group by no more than five unsubstituted carbon atoms. Thus, it was found that dienes such as butadiene and 1,4-pentadiene, react to form the organometallic aluminum polymers of the present invention. It was further found that additional unsaturation, either aromatic or ethylenic, does not prevent the formation of the polymer. Thus, myrcene, a triene and 2-phenyl butadiene form organometallic aluminum polymers. Furthermore, an internally unsaturated diene such as 1,3-pentadiene and phellandrene, form polymers with aluminum. In the case of the internally unsaturated diene, however, it was found that the double bond does not react in the internally unsaturated position, but migrates to a terminal methyl group at which point the aluminum adds to the hydrocarbon radical. Higher temperatures and substantially longer reaction times are required for this type of diene to form the polymer. Cyclic dienes which do not contain a terminal methyl group do not form polymers with aluminum. Thus, vinyl cyclohexene forms an aluminum trialkenyl and not a polymer, since the second double bond is internal and has no opportunity to migrate to a terminal methyl group for further reaction. Where the terminal double bonds are separated by more than four unsubstituted carbon atoms, the polymerization is substantially avoided, since cyclization of the diene to a cycloalkyl group occurs preferentially. Thus, 1,5-hexadiene forms aluminum trimethylene cyclopentyl instead of the hexadiene aluminum polymer. The same occurs in a idene with an internal double bond which during the reaction migrates to a methyl group removed by more than five unsubstituted carbon atoms. However, if the intervening carbon atoms are substituted, the cyclization reaction is suppressed. The number of carbon atoms in the diene employed is not critical, although polymers wherein the alkylene bridge contains more than fifteen carbon atoms have not been prepared.

It had originally been assumed that the reaction of aluminum with dienes as above illustrated results in the formation of aluminum trialkenyls, since the literature has disclosed that the addition of aluminum alkyl halides to butadiene to form compounds containing more than one aluminum has not been feasible. The reactions, believed to result in aluminum trialkenyls, in fact, however, give rise to the above-described polymers.

It was discovered that the polymeric organometallic aluminum compounds of the present invention are surprisingly more stable towards hydrolysis than the aluminum alkyls known heretofore. Thus, the aluminum compounds of the present invention, when dissolved in organic solvents, can be treated with water at room temperatures for an extended period without significant decomposition and can even be treated with acids at room temperatures with only partial decomposition. Only at elevated temperatures do the polymeric organometallic aluminum compounds hydrolyze at an appreciable rate to the aluminum salt and saturated as well as unsaturated hydrocarbons. The stable aluminum hydrocarbon polymers of the present invention may, furthermore, be exposed to the atmosphere and, in addition, possess long shelf lives.

The stable organometallic aluminum polymers may be employed in the formation of coordination catalysts by reaction with transition metal halides wherein the metal is selected from groups IV–B, V–B, and VI–B of the Periodic Table of Elements, such as described in the Handbook of Chemistry and Physics, Chemical Rubber Publishing Company, 37th edition, page 392, and employed in the polymerization of olefins, such as ethylene, propylene, butene, etc., and in copolymerizations of two or more of such α-olefins. The preferred halides include the bromides, chlorides, oxychlorides, and oxybromides of titanium, zirconium, vanadium and chromium. Specific examples of the halides are tatanium tetrachloride, titanium trichloride, titanium tetrabromide, zirconium tetrachloride, zironium tetrabromide, vanadium tetrachloride, vanadium trichloride and vanadium oxytrichloride. The catalysts are formed at temperatures within 0° to 300° C. when the transition metal halide is contacted with the organometallic aluminum polymer. Preferably, the catalysts are heated to temperatures of 100° to 300° C. during their preparation, prior to, or during their use to achieve maximum catalytic activity. For best results, the catalysts are formed in an inert hydrocarbon solvent which is also suitable as polymerization medium. Examples of suitable solvents are saturated liquid hydrocarbons and aromatic hydrocarbons, such as heptane, cyclohexane, benzene and toluene. Catalyst formation is sufficiently rapid to allow formation of the catalyst in the polymerization zone in the presence of monomer. The reaction leading to the formation of the catalyst is not clearly understood but is believed to involve the reduction of the transition metal to a lower, catalytically active valence state. Formation of catalyst occurs at any ratio of the organometallic aluminum polymer to transition metal halide if sufficient quantities of the aluminum compound are present to allow the reduction of the transition metal halide to a valence state below three. This can be readily determined by measuring the number of Al—$CH_2$ bonds in the polymer, which is accomplished by hydrolysis of these bonds and analysis of the hydrolysis products, and calculating the amount of the aluminum polymer on the basis that each Al—$CH_2$ is capable of reducing the valence state of one transition metal halide molecule by one valence state. In general, molar ratios of Al—$CH_2$ bonds to transition metal halide varying from 1 to 30 are employed.

The novel organometallic aluminum compounds of the present invention may be prepared by various methods. Thus, they may be prepared by the reaction of an alkenyl halide with an aluminum magnesium alloy. Preferably the organoaluminum compounds of the present invention are prepared from diolefins by a process such as involving the reaction of aluminum hydrides, or lithium aluminum hydrides with the corresponding diolefin to form the alkenyl aluminum hydride or the lithium aluminum alkenyl hydride. The aluminum alkenyl hydride can be obtained from the lithium aluminum alkenyl hydride by reacting the latter with aluminum trichloride. The alkenyl aluminum hydride then reacts to form the polymeric structure. A method suitable for the large scale production of the organometallic aluminum polymers comprises the reaction of unoxidized finely divided aluminum with hydrogen and the desired diolefin directly to the aluminum alkenyl hydride employing an aluminum trialkyl as the catalyst. The novel organometallic aluminum polymers may also be prepared by exchange reaction of aluminum trialkyl with the desired diolefin, as illustrated hereinabove. In general, methods employed for the preparation of the aluminum trialkyls and aluminum triaryls may be employed for the preparation of the organometallic aluminum polymers. All of these methods have been described in detail in the art.

The present invention is further illustrated by the following examples which show the preparation of the aluminum-diene polymers of the present invention, their hydrolytic stability and their usefulness in the polymerization of ethylenically unsaturated monomers.

EXAMPLE I

A one liter round-bottom flask was fitted with a condenser, dropping funnel, magnetic stirrer, thermometer, heating mantle and an SSV stopper. The exit end of the condenser was connected to an oil filled bubbler and the apparatus was swept with nitrogen. To the reactor was added 300 ml. of decahydronaphthalene, 80 ml. of isoprene and one ml. of 0.2 molar nickel acetyl acetone. To the dropping funnel was added 50 ml. of decahydronaphthalene and 51 ml. of triisobutyl aluminum (TIBA). The conduct of the reaction is further described by the following table in which time, temperature, TIBA solution added to reactor, and sample removal are described.

Table I

| Total Time | Temp., °C. | TIBA Solution Added in ml. | Remarks |
|---|---|---|---|
| 0 min | 25 | 10 | |
| 15 min | 78 | 25 | Gas Evolution. |
| 35 min | 78 | | Sample A. |
| 1 hr. 15 min | 78 | 50 | Sample B. |
| 1 hr. 50 min | 81 | | Sample C. |
| 2 hr. 30 min | 85 | | Sample D. |
| 2 hr. 35 min | 85 | 75 | |
| 2 hr. 40 min | 83 | | 10 ml. isoprene added. |
| 3 hr. 50 min | 87 | | Sample E. |
| 3 hr. 55 min | 85 | 101 | Strong Gas Evolution. |
| 4 hr. 10 min | 85 | | 10 ml. isoprene added. |
| 4 hr. 50 min | 84 | | Sample F. |
| 5 hr. 50 min | 84 | | Sample G. |
| 6 hr. 50 min | 88 | | Sample H. |
| 7 hr | 85 | | 10 ml. isoprene added. |
| 11 hr. 15 min | 85 | | 20 ml. isoprene added (Sample I). |
| 22 hr. 45 min | 84 | | Sample J. |
| 24 hr. 30 min | 85 | | Sample K. |
| 25 hr. 30 min | 115 | | Sample L. |
| 28 hr | 40 | | Sample M. |

The isoprene was added by means of a syringe through the SSV stopper. Samples were withdrawn in the same manner and then injected into a sealed bottle containing 15 ml. of 0.5 N sulfuric acid. The bottle was then heated and samples of the gaseous hydrolysis products were removed by a syringe and analyzed by gas chromatography. The low boiling hydrolysis products formed are isobutane from the isobutyl group, 2-methyl butene and 3-methyl butene from the dihydroisoprenyl group, and isopentane from the tetrahydroisoprenylene group.

The analysis of the sample is expressed as follows:

$$\text{Molar ratio } X = \frac{\text{Isopentane} + \text{methyl butenes}}{\text{Isobutane}}$$

$$\text{Molar ratio } Y = \frac{\text{Isopentane}}{\text{Methyl butenes}}$$

Ratio X is a measure of the isobutyl groups replaced, and ratio Y is a measure of the isoprene units bonded to two and to one aluminum atom. The following results were obtained.

| Sample | X | Y |
|---|---|---|
| A | 0.30 | 0.16 |
| B | 0.60 | 0.40 |
| C | 0.37 | 0.15 |
| D | 0.69 | 0.14 |
| E | 0.57 | 0.38 |
| F | 0.47 | 0.40 |
| G | 0.56 | 0.39 |
| H | 0.77 | 0.44 |
| I | 0.92 | 0.55 |
| J | 1.45 | 0.56 |
| K | 1.52 | 0.61 |
| L | 1.48 | 0.63 |
| M | 2.00 | 0.84 |

Thus, it is seen that at least two-thirds of the isobutyl groups have been replaced or modified by isoprene units at the end of the reaction and that of the $C_5$ units present approximately 4 out of 10 of these units are bonded to two aluminum atoms. In the hydrolysis of the above aluminum-isoprene polymer, there was also obtained some $C_9$ and $C_{10}$ alkanes and alkenes showing that addition reaction had taken place and that the resulting radicals had entered into the bridging or polymer forming reactions.

Isoprene and decahydronaphthalene were then removed from the reaction mixture by vacuum distillation and a product weighing 52.4 g. having an aluminum content of 9.3% was obtained. The molecular weight of the product was 600, indicating an average degree of polymerization of three. No aluminum triisobutyl could be detected in the product. This product was then held for 30 minutes at a temperature of 155° to 165° C. under nitrogen. The resulting organometallic polymer had an X ratio of 4.3 and a Y ratio of 6, showing that over 80% of the aluminum-$C_4$ bonds had reacted with unsaturated groups present and that over 80% of the isoprene units in the polymer were bonded to two aluminum atoms. The polymer was found to have a molecular weight of 2000, indicating a degree of polymerization of about eight. Further heating was found to increase the molecular weight of the polymer.

The organometallic aluminum polymer so prepared was found to have improved hydrolytic stability as compared to aluminum triisobutyl. The organometallic aluminum polymer was employed in the formation of a coordination catalyst by reacting 0.5 millimole of titanium tetrachloride with 4.5 milliequivalents of the polymer in 300 ml. of Decalin. The resulting catalytic activity in the polymerization of ethylene at 110° C. and an ethylene pressure of 15 p.s.i. was found to be equivalent to the equivalent amount of aluminum triisobutyl based on the number of Al—$CH_2$ bonds. It was further found that the remaining number of Al-isobutyl bonds in the organometallic polymer did not give rise to polymeric activity, since the equivalent quantity of aluminium-isobutyl bonds when used as aluminium triisobutyl did not give rise to any high molecular weight polymer. The example, when repeated with 1,4-pentadiene and 1,3-pentadiene, gives aluminum diene polymers having similar characteristics in respect to degree of polymerization, catalytic activity and hydrolytic stability.

EXAMPLE II

Into a 500 ml. flask equipped with thermometer and efficient reflux condenser is charged, under dry nitrogen, 35 g. (0.177 mole) of aluminum triisobutyl, 100 g. (0.7 mole) of myrcene and 35 ml. of benzene. The benzene was added to facilitate reflux and allow rapid removal of liberated isobutylene. The reaction mixture was then heated and refluxed steadily for a period of 13 hours. During that period over 90% of the theoretical quantity of isobutylene in the reaction mixture was obtained in a cold trap attached to the reflux condenser. Remaining unreacted starting material and benzene were removed from the reaction mixture by heating under vacuum (80°/5 mm. Hg) for 3 hours. There was obtained 78 g. of an amber viscous liquid. The product was found to have a molecular weight of approximately 1750 and a degree of polymerization of approximately four.

A solution of 8.9 g. of the product in 50 ml. cyclohexane was prepared. The solution was hydrolyzed at room temperature by the addition of excess aqueous hydrochloric acid and was back titrated with a dilute aqueous solution of sodium hydroxide. The amount hydrolyzed corresponded to a concentration of 0.017 molar assuming the polymer to be an aluminium trihydrocarbon. The hydrolysis was repeated at 60–70° C. and the amount hydrolyzed corresponded to a concentration of 0.28 molar.

The hydrolytic stability of aluminium triisobutyl at room temperature was tested by the same procedure. A solution of aluminium triisobutyl which was 0.20 molar was hydrolyzed as above described, and the amount hydrolyzed corresponded to a concentration of 0.20 molar. Similarly a solution of aluminum tricyclohexenylethyl which was 0.23 molar, was hydrolyzed, and the amount hydrolyzed corresponded to a concentration of 0.19 molar.

The polymerization of ethylene employing the organometallic aluminium-myrcene polymer is shown by the following experiment:

Into a glass vessel equipped with reflux condenser, stirrer, gas inlet and outlet means, was charged under nitrogen 24 micromoles of titanium tetrachloride, 8 micromoles of vanadium oxytrichloride, 0.14 g. of the organometallic aluminum myrcene polymer and 100 ml. of decahydronaphthalene. The nitrogen was replaced with ethylene at atmospheric pressure, and the reaction mixture was agitated and heated to 110° C. Polymerization was continued with agitation for 2 hours, while maintaining the temperature and replenshing the ethylene adsorbed by the reaction mixture. After 2 hours, 1540 ml. of ethylene had been converted into high molecular weight polymer. $Al(i-Bu)_3$ was found to polymerize 1800 ml. of ethylene under the same conditions.

EXAMPLE III

Into a glass flask equipped with an efficient reflux condenser was charged under nitrogen 150 g. of myrcene and 10 g. of lithium aluminum hydride. The reaction mixture was heated to 130° C. causing a vigorous reaction to set in. To the reaction mixture was then added 350 ml. of xylene, heating was continued to maintain the reflux temperature, 145° C. After refluxing steadily for 2 hours the reaction mixture was cooled to 85° C. and 11 g. aluminum chloride was added to decompose the lithium aluminum organometallic compound. The addition was carried out in small portions to moderate the reaction. The reaction mixture was refluxed for an additional 3.5 hours and then cooled to room temperature, centrifuged and filtered to remove any solid residues. The filtrate was vacuum distilled to remove unreacted starting material and the solvent. An amber viscous liquid weighing 114 g. remained and was an organometallic polymer of myrcene and aluminum (found, 6.3% Al), having an average molecular weight of 1000 and an approximate degree of polymerization of 3.5. The organometallic polymer produced in the instant case consisted substantially of aluminum, dihydromyrcenyl groups and tetradihydromyrcenylene groups.

Hydrolysis of a 0.51 molar solution of the aluminum myrcene polymer in cyclohexane showed the amount hydrolyzed corresponded to 0.04 molar solution at 10° C., 0.14 molar solution at room temperature, and 0.53 molar solution at the boiling point of the solution using the assumption of Example II.

EXAMPLE IV

Into a reaction flask equipped with an efficient reflux condenser was charged under dry nitrogen 42.5 g. of aluminum triisobutyl, 111 g. of α-phellandrene and 35 ml. of benzene. The reaction mixture was steadily refluxed for 21 hours. The resulting product was vacuum distilled to remove unreacted starting material. There was obtained 81 g. of viscous oil which was an organometallic phellandrene-aluminum polymer.

The hydrolytic stability of the aluminum-phellandrene polymer was tested by dissolving 33 g. of the material in 75 ml. of cyclohexane giving a 0.7 molar solution. Hydrolysis with dilute aqueous hydrochloric acid at room temperature indicated the amount hydrolyzed to correspond to a 0.18 molar concentration using the assumption of Example II. Hydrolysis at the boiling point of the solution indicated the amount hydrolyzed to correspond to a molar concentration of 0.64, using the same assumption.

The phellandrene-aluminum polymer was employed in the polymerization of ethylene employing the procedure in Example II. The catalyst was formed by admixing 24 micromoles of titanium tetrachloride and 8 micromoles of vanadium oxytrichloride with 0.07 g. of the phellandrene-aluminum polymer. A total of 1450 ml. of ethylene was converted to polymer in 2 hours.

In this example the polymer was formed by migration of the internal double bond to one of the two terminal methyl groups.

EXAMPLE V

Into a glass reaction flask was charged under nitrogen 4.55 g. of lithium aluminum hydride, 64.6 g. of 2-phenylbutadiene. The reaction mixture was heated to 125° C. and 100 ml. of xylene was added. The mixture was refluxed for 3.5 hours at 145° C. and then cooled to 85° C., at which temperature 5.3 g. of aluminum trichloride was gradually added. Refluxing was then continued for an additional 1.5 hours. The mixture was then cooled, centrifuged and filtered. Volatile materials were removed by heating at 85° C./2 mm. Hg for 4.5 hours. There remained a yellow solid material which was an organometallic 2-phenyl butadiene aluminum polymer.

The hydrolytic stability of the product was measured by dissolving it in 125 ml. of cyclohexane, and treating the solution at room temperature with aqueous hydrochloric acid. The amount hydrolyzed correspond to a 0.11 molar solution using the assumption of Example II. At the boiling point of the solution, a similar hydrolysis was performed and the amount hydrolyzed corresponded to a 4.5 molar concentration of the product.

The activity of the organometallic polymer in the formation of polymerization catalysts was tested by the procedure disclosed in Example II. Employing a catalyst formed by the reaction of 24 micromoles of titanium tetrachloride and 8 micromoles of vanadium oxytrichloride with 0.06 g. of the 2-phenyl butadiene aluminum polymer, 1070 ml. of eythlene was converted into high molecular weight polyethylene.

EXAMPLE VI

Into a 330 ml. stainless steel reaction vessel was charged under nitrogen 39.0 g. of finely divided aluminum, 120.0 g. of aluminum-myrcene polymer and 358 g. of myrcene. The nitrogen was replaced with hydrogen and the reaction vessel was heated to 140° C. and pressured with additional hydrogen until a pressure of 2100 p.s.i. was reached. The reaction vessel was agitated for a period of 7.5 hours while maintaining the temperature at 140° C. and the pressure at 1700 to 2000 p.s.i. The total pressure drop in that period was 950 p.s.i. There was obtained 480.8 g. of a highly viscous myrcene aluminum polymer.

EXAMPLE VII

Using the equipment of Example I, there was charged under nitrogen 600 ml. of decahydronaphthalene, 160 ml. of isoprene and 2 ml. of a 0.2 molar suspension of nickel acetylacetone. Into the funnel was charged 100 ml. of decahydronaphthalene and 100 ml. of aluminum triisobutyl. The reaction was carried out as indicated in the table. Additional isoprene was added as shown.

*Table II*

| Time | Temperature in °C. | Total Al (i-Bu)$_3$ added in ml. | Isoprene—added in ml. |
|---|---|---|---|
| 0 min | 45 | 20 | |
| 10 min | 72 | | |
| 20 min | 73 | | 50 |
| 60 min | 75 | | |
| 1 hr. 50 min | 80 | 100 | |
| 3 hr. 10 min | 89 | 150 | 20 |
| 4 hr. 25 min | 88 | | 20 |
| 4 hr. 40 min | 85 | 200 | |
| 5 hr. 05 min | 85 | | 20 |
| 5 hr. 20 min | 84 | | |
| 20 hr. 40 min | 105 | | |
| 21 hr. 20 min | 135 | | |
| 21 hr. 55 min | 155 | Reaction stopped | |

The resulting product was vacuum distilled to remove isoprene and decahydronaphthalene. This product was held at 130° C. for 30 minutes and at 155° C. for 30 minutes. On standing for two days the product was a solid, slightly tacky polymer of isoprene and aluminum. The molecular weight was indicated to be above 3000 and the average degree of polymerization above 10. The polymer was found to have an X ratio of 5.6 and a Y ratio of 22.3. Total yield of polymer was 83 g. A 2.1 g. sample was dissolved in 10 ml. of cyclohexane.

Into a reaction flask was charged 200 ml. of decahydronaphthalene, 1 micromole of titanium tetrachloride and 0.33 micromole of aluminum triisobutyl. The reaction mixture was heated to reflux for 15 minutes causing purple titanium trichloride to form. The reaction mixture was cooled to 110° C. under propylene and a 3.5 ml. portion of the solid aluminum isoprene polymer dissolved in the cyclohexane was added. To activate the catalyst formation the reaction was flash heated to 135° C. and then maintained at 110° C. for about 30 min. The polymerization, although proceeding smoothly, was cut off after the 30 min. On work-up, there was obtained crystalline polypropylene having a melt index of 6.76 and weighing 7.28 g.

Following the polymerization procedure of the above examples, active catalysts polymerizing ethylene to high molecular weight polymers were obtained by the reaction of the following combinations:

(1) Vanadium tetrachloride and aluminum myrcene polymer,
(2) Zirconium tetrachloride and aluminum isoprene polymer,
(3) Chromium tribromide and aluminum isoprene polymer,
(4) Titanium trichloride and aluminum 1,3-pentadiene polymer,
(5) Vanadium oxytrichloride and aluminum isoprene polymer,
(6) Titanium tetrabromide and aluminum myrcene polymer.

The aluminum-diene polymers of the present invention have the advantage that they are hydrolytically stable at room temperatures, and that they may be exposed to the atmosphere without decomposition. They further possess a higher thermal stability than the aluminum alkyls and aryls known heretofore, and, thus, may be employed in reactions at elevated temperatures.

The formation of aluminum diene polymer using the described methods of synthesis is not limited to the formation of organometallic aluminum polymers, but may also be used in the formation of diene polymers with such polyvalent metals as boron, magnesium, calcium, beryllium, lead and tin.

As shown by the examples, the aluminum diene polymers of the present invention may be employed to prepare active polymerization catalysts by reaction with transition metal halides which at elevated temperatures have catalytic activity at least equal to reaction products of transition metal halides and aluminum trialkyls at the same temperatures. Catalysts formed from transition metal halide with aluminum diene polymers, furthermore, result in higher molecular weights. This is of particular significance in the polymerization of propylene where it is difficult to prepare high molecular weight polymer. The explanation for this phenomena is still undetermined, but it is believed that the higher molecular weights result from the simultaneous growth of polymer at two ends of a catalyst molecule which are initially linked through the alkylene bridge. The greater stability of the aluminum-diene polymer reduces the amount of active polymerization catalyst formed before the desired polymerization temperature is reached. Hence, the control of the polymerization process is improved and narrower molecular weight distributions are produced in the resulting polymer which is highly advantageous in view of the improved physical properties resulting from the narrower molecular weight distribution.

We claim:

1. A polymerization catalyst comprising the reaction product obtained by admixing in an inert diluent a transition metal halide, wherein the transition metal is selected from the class consisting of the metals in groups IV–B, V–B and VI–B of the Periodic Table of Elements, said metal having a valence state above 2, with an aluminum diene polymer selected from the class consisting of polymers having the formula:

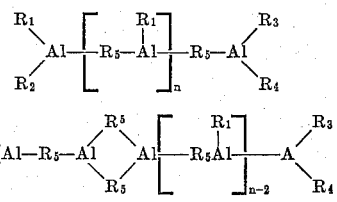

and polymers having units having the formula

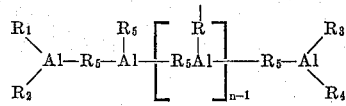

wherein $R_1$, $R_2$, $R_3$ and $R_4$ are selected from the class consisting of isobutyl radical, the alkenyl radical of a diene, the alkenyl radical formed by the addition of a diene to the isobutyl group, and the alkenyl radical formed by the addition of a diene to the alkenyl radical; $R_5$ is selected from the class consisting of the alkylene radical of a diene, the alkylene radical formed from the addition product of a diene with an isobutyl group, and the alkylene radical formed from the addition product of a diene with an alkylene radical; $n$ is 1 to 20, said diene being selected from the class consisting of isoprene, myrcene, phellandrene, and phenyl butadiene, the molar ratio of the transition metal halide to the Al—CH$_2$ bonds in the aluminum diene polymer being from 1:1 to 1:30.

2. The polymerization catalyst of claim 1 wherein the aluminum diene polymer is an aluminum isoprene polymer.

3. The polymerization catalyst of claim 1 wherein the transition metal halide is a titanium halide.

4. The polymerization catalyst of claim 1 wherein the transition metal halide is a vanadium halide.

5. The polymerization catalyst of claim 2 wherein the transition metal halide is a titanium chloride.

6. The polymerization catalyst of claim 2 wherein the transition metal halide is a vanadium chloride.

References Cited by the Examiner

UNITED STATES PATENTS 2,826,598  3/58  Ziegler _____ 260—448
3,029,231  4/62  Van Amerongen _____ 252—429

FOREIGN PATENTS 1,052,987  3/59  Germany.
1,222,575  1/60  France.

TOBIAS E. LEVOW, *Primary Examiner.*

SAMUEL H. BLECH, *Examiner.*